(12) United States Patent
Tuchiya

(10) Patent No.: US 10,309,458 B2
(45) Date of Patent: Jun. 4, 2019

(54) BRUSHLESS MOTOR

(71) Applicant: Tokyo Parts Industrial Co., Ltd., Gunma-ken (JP)

(72) Inventor: Masahisa Tuchiya, Gunma-ken (JP)

(73) Assignee: Tokyo Parts Industrial Co., Ltd. (JP)

( * ) Notice: Subject to any disclaimer, the term of this patent is extended or adjusted under 35 U.S.C. 154(b) by 323 days.

(21) Appl. No.: 15/287,029

(22) Filed: Oct. 6, 2016

(65) Prior Publication Data

US 2017/0167537 A1  Jun. 15, 2017

(30) Foreign Application Priority Data

Dec. 10, 2015 (JP) ................... 2015-240770

(51) Int. Cl.
| | | |
|---|---|---|
| *F16C 17/10* | (2006.01) | |
| *F16C 33/10* | (2006.01) | |
| *F16C 33/12* | (2006.01) | |
| *H02K 5/167* | (2006.01) | |

(52) U.S. Cl.
CPC .......... *F16C 33/128* (2013.01); *F16C 17/107* (2013.01); *F16C 33/104* (2013.01); *H02K 5/1675* (2013.01); *F16C 2226/12* (2013.01); *F16C 2380/26* (2013.01)

(58) Field of Classification Search
CPC .... F16C 33/128; F16C 33/104; F16C 17/107; F16C 2380/26; F16C 2226/12; H02K 5/1675; H02K 5/16; H02K 7/085
USPC ............................................. 310/90, 91, 89
See application file for complete search history.

(56) References Cited

U.S. PATENT DOCUMENTS

| | | | | |
|---|---|---|---|---|
| 9,143,017 | B2 * | 9/2015 | Horng | H02K 5/167 |
| 2014/0118859 | A1 * | 5/2014 | Yun | G11B 19/2036 |
| | | | | 360/99.12 |
| 2014/0199189 | A1 * | 7/2014 | Tamaoka | F04D 25/062 |
| | | | | 417/354 |
| 2016/0072358 | A1 * | 3/2016 | Roland | H02K 7/025 |
| | | | | 307/68 |
| 2016/0099631 | A1 * | 4/2016 | Kim | H02K 7/086 |
| | | | | 360/75 |
| 2016/0102672 | A1 * | 4/2016 | Liu | F04D 29/058 |
| | | | | 417/423.12 |

FOREIGN PATENT DOCUMENTS

| | | | |
|---|---|---|---|
| CA | 2796481 | A1 * | 10/2013 |
| JP | 2006-292161 | | 10/2006 |
| JP | 2009-085355 | | 4/2009 |

OTHER PUBLICATIONS

U.S. Appl. No. 15/277,163, filed Sep. 27, 2016, Masahiro Nishidate.
U.S. Appl. No. 15/286,926, filed Oct. 6, 2016, Masahiro Nishidate.

\* cited by examiner

*Primary Examiner* — Forrest M Phillips
(74) *Attorney, Agent, or Firm* — Jordan and Koda, PLLC

(57) ABSTRACT

A double bearing comprising an inner bearing and an outer bearing, which has a greater oil content than the inner bearing, is used as a bearing for a brushless motor. The inner bearing has an upper bearing part, a lower bearing part, and a central relief part. Gaps are provided between the bearing parts and a bearing housing, along the entire axial length of all of the bearing parts of the inner bearing.

18 Claims, 7 Drawing Sheets

BRUSHLESS MOTOR

BACKGROUND OF THE INVENTION

The present invention relates to a brushless motor using an oil-impregnated bearing.

Outer rotor type brushless motors are used as spindle motors for rotationally driving color wheels in projectors, polygon mirrors in printers and the like. In a motor of this sort, high precision rotational performance is required, and while primarily rolling bearings were conventionally used for bearings therein, problems with rotation noise and difficulties in achieving cost reductions has meant that oil-impregnated bearings, which are made of a porous material impregnated with lubricating oil at the interior, have recently come into use.

In terms of oil-impregnated bearings of the sort described above, Japanese Patent Laid-Open Publication No. 2006-292161 describes a double bearing unit comprising an inner part made from a compacted sintered metal body having bearing parts at both ends, and an outer part, this inner part being concentrically press fit at the inner circumferential face of the outer part. A compacted sintered metal material having a lower density than the inner part is used for the outer part in this bearing unit.

With the bearing unit described in Japanese Patent Laid-Open Publication No. 2006-292161, a larger amount of lubricating oil can be retained in the outer part than in the inner part and a good density gradient is formed by way of the capillary action of the inner part, which has a higher density than the outer part, such that lubricating oil will tend to be gradually drawn into the inner part from the outer part. Consequently, a bearing unit can be produced with which there is little vibration, such that it is very quiet and has an extended life.

Furthermore, Japanese Patent Laid-Open Publication No. 2009-85355 describes an oil-impregnated bearing mechanism provided with an oil-impregnated double bearing comprising an inner bearing made from a porous material containing a lubricant and having an inner circumferential face serving as a bearing face that rotatably supports a shaft, and an outer bearing made from a porous material containing a lubricant, which has a higher porosity than the inner bearing. In this oil-impregnated bearing mechanism, a communicating groove, which communicates with the exterior, is formed between the outer circumferential face of the inner bearing and the inner circumferential face of the outer bearing, using a portion of the outer circumferential face of the inner bearing and a portion of the inner circumferential face of the outer bearing.

With the oil-impregnated bearing mechanism described in Japanese Patent Laid-Open Publication No. 2009-85355, a communicating groove is formed between the outer circumferential face of the inner bearing and the inner circumferential face of the outer bearing, such that lubricant exuded from the inner bearing and the outer bearing can be retained in this communicating groove, allowing an oil-impregnated bearing mechanism to be produced which has an extended life.

With the oil-impregnated double bearings described in Japanese Patent Laid-Open Publication No. 2006-292161 and Japanese Patent Laid-Open Publication No. 2009-85355, if the outer part (outer bearing) has a lower density than the inner part (inner bearing), it is possible to maintain the inner diameter precision of the inner part when the inner part is press fit into the outer part.

However, when a motor is configured using the oil-impregnated double bearings described in Japanese Patent Laid-Open Publication No. 2006-292161 and Japanese Patent Laid-Open Publication No. 2009-85355, there are problems insomuch as, when the oil-impregnated double bearing is press fit into a housing, it is difficult to maintain the inner diameter precision of the inner part that directly supports the shaft, and thus it is difficult to achieve high precision rotational performance.

SUMMARY OF THE INVENTION

One or more embodiments of the present invention provides a brushless motor that solves the aforementioned problems included in the prior art, allowing for high precision rotational performance and extended life. Note that, in the aspects described below, the constituent elements employed can be used in the most freely chosen combinations possible. Furthermore, the aspects and technical features of the present invention are not limited to those described hereafter, and are to be understood based on the description in the entire specification and the drawings, or based on the inventive ideas that can be grasped by those skilled in the art on the basis of these descriptions.

A first aspect of the present invention relating to a brushless motor comprises:

a rotor having a shaft;

a cylindrical bearing that supports the shaft in the radial direction with oil as an intermediary medium; and a bearing housing that is open at the top end, and at the interior of which the bearing is fastened, wherein:

the bearing has an inner bearing made from a porous oil-impregnated material and an outer bearing made form a porous oil-impregnated material, mounted on the outer circumferential face of the inner bearing;

the inner bearing has a bearing part formed protruding in the radially inward direction;

the oil content of the outer bearing is greater than that of the inner bearing; and a gap is provided between the bearing part and the bearing housing located radially outward from the bearing part, along the entire axial length of the bearing part.

In a second aspect of the present invention, the bearing part comprises an upper bearing part provided at the top end of the inner bearing, and a lower bearing part provided at the bottom end of the inner bearing.

In a third aspect of the present invention, the gap is provided between the outer bearing and the bearing housing located radially outward from the upper bearing part, along the entire axial length of the upper bearing part, and the gap is provided between the lower bearing part and the outer bearing located radially outward from the lower bearing part, along the entire axial length of the lower bearing part.

In a fourth aspect of the present invention, the gap is provided between the upper bearing part and the outer bearing located radially outward from the upper bearing part, along the entire axial length of the upper bearing part, and the gap is provided between the outer bearing and the bearing housing located radially outward from the lower bearing part, along the entire axial length of the lower bearing part.

In a fifth aspect of the present invention, the gap is provided between the outer bearing and the bearing housing located radially outward from the upper bearing part, along the entire axial length of the upper bearing part, and the gap is provided between the outer bearing and the bearing housing located radially outward from the lower bearing part, along the entire axial length of the lower bearing part.

In a sixth aspect of the present invention, the gap is provided between the upper bearing part and the outer bearing located radially outward from the upper bearing part, along the entire axial length of the upper bearing part, and the gap is provided between the lower bearing part and the outer bearing located radially outward from the lower bearing part, along the entire axial length of the lower bearing part.

In a seventh aspect of the present invention, a groove communicating in the axial direction is provided between the outer circumferential face of the inner bearing and the inner circumferential face of the outer bearing.

In an eighth aspect of the present invention, a groove communicating in the axial direction is provided between the outer circumferential face of the outer bearing and the inner circumferential face of the bearing housing.

In a ninth aspect of the present invention, a groove communicating in the axial direction is provided between the outer circumferential face of the inner bearing and the inner circumferential face of the outer bearing, and a groove communicating in the axial direction is provided between the outer circumferential face of the outer bearing and the inner circumferential face of the bearing housing.

In a tenth aspect of the present invention, an annular groove is formed in the outer surface of the shaft in a portion of the shaft that protrudes from the inner bearing toward the opening in the bearing housing.

In an eleventh aspect of the present invention, an annular oil repellant member is mounted in the opening of the bearing housing and the bottom face of the oil repellant member is at a higher position than the top edge of the annular groove.

According to one mode of embodiment of the present invention, working life can be extended by using a double bearing comprising an inner bearing and an outer bearing, and the precision of the inner diameters of the bearing parts of the inner bearing can be maintained when the double bearing is fastened, supported within the bearing housing, such that high precision rotational performance can be achieved.

DETAILED DESCRIPTION OF THE PREFERRED EMBODIMENTS

Hereafter, exemplary modes of embodiment of the present invention are described with reference to the drawings.

Figure 1:
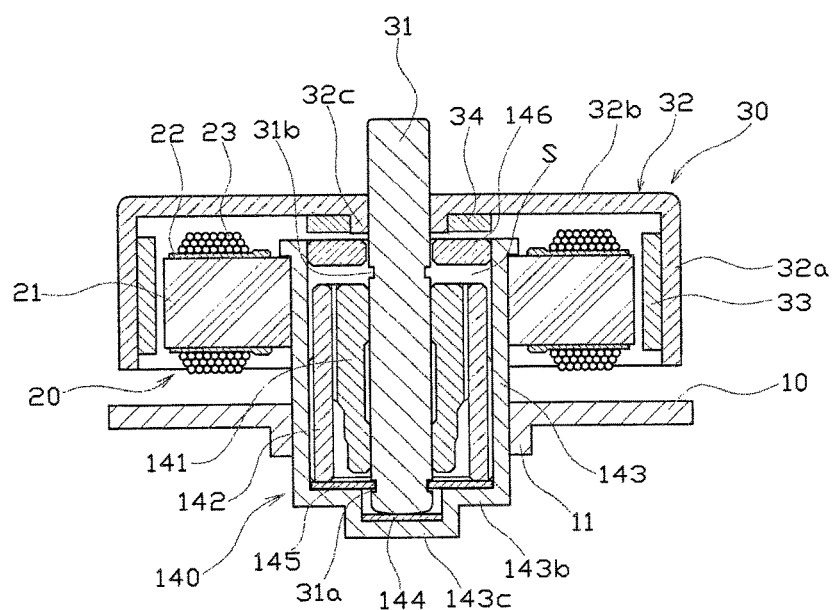
FIG. 1 is a longitudinal sectional view of a brushless motor according to a first exemplary mode of embodiment of the present invention.

Note that, in the present specification, the upward direction in FIG. 1 is referred to as "upper" and the downward direction in FIG. 1 is referred to as "lower." Furthermore, the upward and downward directions do not indicate positional relationships or directions when the motor is assembled in an actual device. Furthermore, the direction parallel to the central axis of the shaft is referred to as the "axial direction" and the radial direction centered on the central axis of the shaft is referred to as the "radial direction."

First Exemplary Mode of Embodiment

Figure 2:
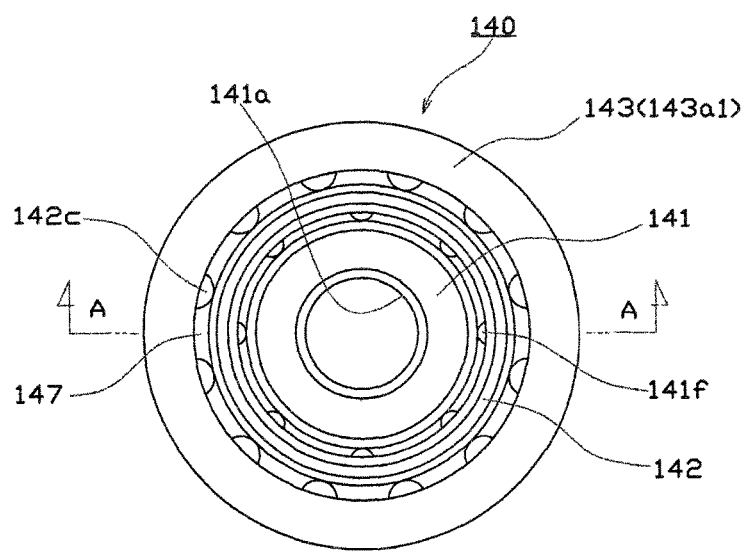
FIG. 2 is a top view of a bearing unit for a brushless motor according to the first exemplary mode of embodiment of the present invention (note that the oil repellent member is omitted).
Figure 3:
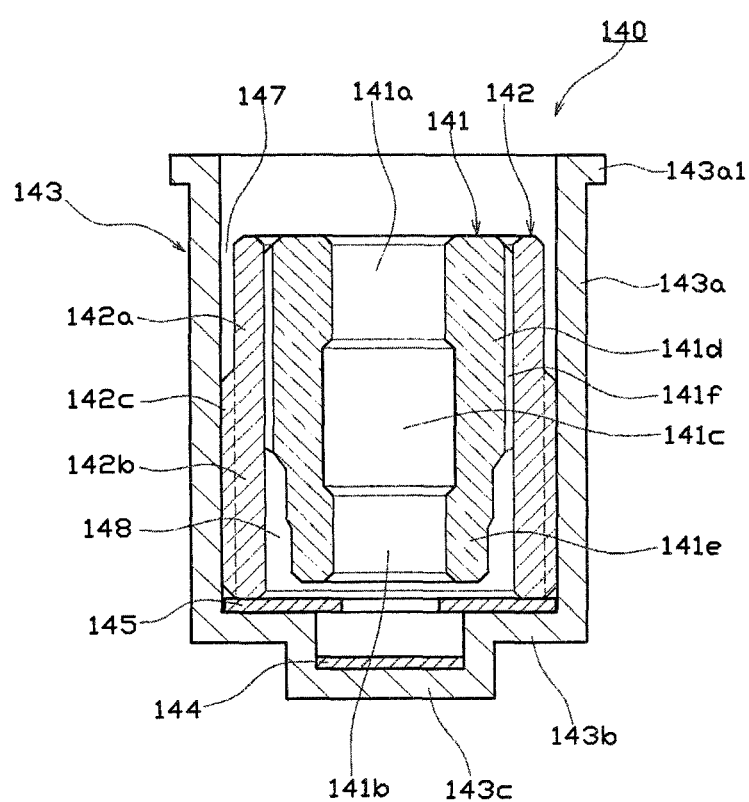
FIG. 3 is a sectional view at A-A in FIG. 2.

A first exemplary mode of embodiment of the present invention will be described using FIG. 1 to FIG. 3.

The brushless motor in this example primarily comprises a mounting plate 10, a stator 20, a rotor 30 and a bearing unit 140.

A so-called steel substrate, on the surface of which a printed circuit is formed, or a substrate in which a printed circuit board is overlaid on steel substrate or the like can be used as the mounting plate 10, and a cylindrical burring part 11 is formed, vertically oriented, in the central part thereof.

On this mounting plate 10, a Hall element (not shown) is provided so as to axially face the bottom edge of a driving magnet 33 (vertical direction in FIG. 1), which is described below, such that the rotation of the rotor 30 can be detected by way of this Hall element.

The stator 20 comprises a stator core 21, a core cover 22 and a coil 23.

The stator core 21 is made from a stack of planar cores formed so as to have a circular opening at the center, with a plurality of salient poles protruding in the radial direction (left-right direction in FIG. 1), the surface of which is covered by a core cover 22, which is made from an insulating resin, and the coils 23 are wound onto the salient poles with this core cover 22 therebetween.

The rotor 30 comprises a shaft 31, a rotor case 32 that rotates united with the shaft 31, and a drive magnet 33, fastened to the inside of the rotor case 32.

The shaft 31 has an elongate substantially cylindrical shape, and is rotatably supported by a bearing unit 140, which is described hereafter.

An engaged part 31*a* is formed in a portion located in the vicinity of the bottom end of the shaft 31, and an annular groove 31*b* is formed in a portion located somewhat above the middle of the shaft 31. This engaged part 31*a* and this annular groove 31*b* are both configured as annular recesses formed in the outer circumference of the shaft 31.

The rotor case 32 is formed from a magnetic metallic plate, and has a cylindrical part 32a formed in a cylindrical shape, which is coaxial with the shaft 31, and a planar top face 32b that covers the top of this cylindrical part 32a. A cylindrically shaped burring part 32c is formed oriented downward in the center of the top face 32b, and the top of the shaft 31 is fastened by way of press fitting into this burring part 32c.

A cylindrical drive magnet 33 is mounted on the inside of the cylindrical part 32a of the rotor case 32, so as to face the salient poles of the stator core 21 in the radial direction (left-right direction in FIG. 1). This drive magnet 33 is multiply and alternatingly magnetized, in the circumferential direction, with North poles and South poles.

Furthermore, a cylindrical magnet 34 is mounted at the outer circumference of the burring part 32c.

The bearing unit 140 serves to rotatably support the rotor 30, and comprises an inner bearing 141, an outer bearing 142, a bearing housing 143, a thrust plate 144, a retaining member 145 and an oil repellent member 146.

The inner bearing 141 is a radial bearing that rotatably supports the shaft 31 in the radial direction with oil as an intermediary medium. The outer bearing 142 is mounted, by way of press fitting or the like, on the outer circumferential face of the inner bearing 141, and is provided so as to function as an oil replenishment mechanism for the inner bearing 141 (a mechanism that provides a supplementary supply of lubricating oil).

Both the inner bearing 141 and the outer bearing 142 are made from a cylindrical porous oil-impregnated material, in which a sintered metal or the like has been impregnated with oil (lubricating oil), the outer bearing 142 having a greater oil content than the inner bearing 141.

To give one example, when a density of approximately 5.5 to 6.6 $g/cm^3$ is used for the inner bearing 141, the oil content will be approximately 22 to 26 vol %, and when a density of approximately 4.1 to 4.9 $g/cm^3$ is used for the outer bearing 142, the oil content will be approximately 38 to 48 vol %.

The inner bearing 141 has an upper bearing part 141a and a lower bearing part 141b, which are each formed protruding in the radially inward direction at the top and bottom ends of a central hole. Between the upper bearing part 141a and the lower bearing part 141b, a central relief part 141c is formed with an inner diameter that is greater than those of the upper bearing part 141a and the lower bearing part 141b.

The inner diameters of the upper bearing part 141a and the lower bearing part 141b are slightly greater than the outer diameter of the shaft 31, allowing the shaft 31 to be rotatably supported in the radial direction by the upper bearing part 141a and the lower bearing part 141b. Furthermore, by providing the central relief part 141c, it is possible to limit overheating of the motor by reducing the sliding resistance with the shaft 31.

The outer shape of the inner bearing 141 is such that there is a large diameter part 141d having a uniform outer diameter in a region extending from the upper bearing part 141a and over the majority of the central relief part 141c, and there is a reduced diameter part 141e, with an outer diameter that is smaller than the large diameter part 141d, in an area extending from the vicinity of the bottom end of the central relief part 141c to the lower bearing part 141b.

A plurality of grooves 141f are formed in the axial direction, equidistantly spaced apart in the circumferential direction, in the outer circumferential face of the large diameter part 141d, and in this example 8 grooves 141f are formed.

The outer bearing 142 is slightly longer in the axial direction than the inner bearing 141, and while the top end-faces of the outer bearing 142 and the inner bearing 141 are flush, the outer bearing 142 protrudes slightly below the inner bearing 141.

The inner diameter of the outer bearing 142 is uniform over the entire length thereof, in the axial direction. The inner diameter of the outer bearing 142 is designed slightly smaller than the outer diameter of the large diameter part 141d of the inner bearing 141, allowing the inner bearing 141 to be fastened mounted at the interior thereof.

The outer shape of the outer bearing 142 is such that there is a reduced diameter part 142a, having a small outer diameter, in a region located radially outward from the upper bearing part 141a of the inner bearing 141 and extending to the vicinity of the top end of the central relief part 141c, and there is a large diameter part 142b, having a larger outer diameter than the reduced diameter part 142a, in a region below the reduced diameter part 142a.

A plurality of grooves 142c are formed in the axial direction, equidistantly spaced apart in the circumferential direction, in the outer circumferential face of the large diameter part 142b of the outer bearing 142, and in this example 12 grooves 142c are formed.

The bearing housing 143 serves to hold and fasten the inner bearing 141 and the outer bearing 142 at the interior thereof, and has a cylindrical part and a bottom so as to form a bottomed cylinder having an open top, with a rim 143a1 formed projecting in the radially outward direction at the top end of the cylindrical part 143a.

A deep-drawn or cut metal part can be used for this bearing housing 143, and in this example a deep-drawn part is used.

The inner diameter of the cylindrical part 143a of the bearing housing 143 is approximately constant. The inner diameter of the cylindrical part 143a is designed slightly smaller than the outer diameter of the large diameter part 142b of the outer bearing 142, allowing the outer bearing 142 to be fastened mounted on the inside.

The bottom of the bearing housing 143 has a double bottomed structure comprising a first bottom 143b and a second bottom 143c, recessed in the center of the first bottom 143b.

The bearing housing 143 is fastened in the burring part 11 of the mounting plate 10 by press fitting or the like. The stator core 21 is fitted at the top of the outer circumference of the bearing housing 143, and fastened abutting against the bottom face of the rim 143a1.

The thrust plate 144 is made from a wear resistant resin plate or the like, and is arranged on the top face of the second bottom 143c of the bearing housing 143, so as to support the bottom end of the shaft 31.

The retaining member 145 is constituted by a ring-shaped washer, and is arranged on the top face of the first bottom 143b of the bearing housing 143. The retaining member 145 is fastened in place with the outer edge trapped between the outer bearing 142 and the first bottom 143b.

The inner diameter part of the retaining member 145 is inserted into the engaged part 31a of the shaft 31. This makes it possible to limit the upward movement of the shaft 31, so that the rotor 30 is prevented from coming out of the bearing unit 140.

The oil repellent member 146, which has a through opening in the center, is made from an annular metal plate, the surface of which has been subjected to oil repellent treatment, and is press fit into the top end of the opening in the bearing housing 143. The diameter of the through opening in the oil repellent member 146 is slightly larger than the outer diameter of the shaft 31, such that a slight gap is provided between the shaft 31 and the oil repellent member 146.

A space S is formed between the bottom face of the oil repellent member 146 and the top faces of the inner bearing 141 and the outer bearing 142, and the annular groove 31b in the shaft 31 faces the space S.

Note that, in this example, a magnetic metallic material is used for the oil repellent member 146, and the rotor 30 is prevented from floating up during rotation by the magnetic attraction that acts in the space between this oil repellent member 146 and the attracting magnet 34, which is disposed so as to face it.

In the brushless motor of this example described above, a double bearing was used, comprising an inner bearing 141 and an outer bearing 142 having a greater oil content than the inner bearing 141, whereby oil is gradually replenished from the outer bearing 142 to the inner bearing 141, which allows for extended motor life.

Furthermore, in the brushless motor of this example, while the inner diameter of the cylindrical part 143a of the bearing housing 143 is uniform, a reduced diameter part 142a, having a smaller outer diameter, is provided in a predetermined region of the outer bearing 142. Consequently, an upper gap 147 is formed between the outer bearing 142 and the bearing housing 143, located radially outward from the upper bearing part 141a, along the entire axial length of the upper bearing part 141a. This upper gap 147 is formed along the entire circumference.

Furthermore, in the brushless motor of the present example, while the inner diameter of the outer bearing 142 is uniform along the entire axial length thereof, a reduced diameter part 141e, having a smaller outer diameter, is provided in a predetermined region of the inner bearing 141. Consequently, a lower gap 148 is formed between the outer bearing 142 located radially outward from the lower bearing part 141b, and the lower bearing part 141b, along the entire axial length of the lower bearing part 141b. This lower gap 148 is formed along the entire circumference.

Thus, in the brushless motor in this example, gaps (the upper gap 147 and the lower gap 148) are provided between the bearing and the bearing housing 143, along the entire axial length of all of the bearing parts (the upper bearing part 141a and the lower bearing part 141b) of the inner bearing 141.

With such a configuration, when the double bearing comprising the inner bearing 141 and the outer bearing 142 is press fit in the bearing housing 143, large compressive forces are effectively prevented from acting in the radial direction on the upper bearing part 141a and the lower bearing part 141b of the inner bearing 141, which directly holds the shaft 31. Consequently, it is possible to prevent contractions in the inner diameters of the upper bearing part 141a and the lower bearing part 141b, such that the precision of the inner diameter of the bearing parts can be maintained, allowing for high precision rotational performance.

Furthermore, in the brushless motor of the present example, axially communicating grooves 141f are provided between the outer circumferential face of the inner bearing 141 and the inner circumferential face of the outer bearing 142.

With such a configuration, oil that is exuded from the inner bearing 141 to the outer circumferential face thereof and oil that is exuded from the outer bearing 142 to the inner circumferential face thereof can be held in the grooves 141f, allowing for further extension of the life of the motor.

Furthermore, in the brushless motor of this example, axially communicating grooves 142c are provided between the outer circumferential face of the outer bearing 142 and the inner circumferential face of the bearing housing 143.

With such a configuration, if the oil expands due to heat when the motor is driven, the oil can be held in the grooves 142c, thus preventing oil leaks to the exterior of the bearing.

Furthermore, in the brushless motor of this example, an annular groove 31b is formed in the outer surface of the shaft 31, in a portion of the shaft that protrudes from the inner bearing 141 in the direction of the opening of the bearing housing 143.

With such a configuration, oil that seeps out at the inner circumferential face of the inner bearing 141 due to the rotation of the shaft 31, passes beyond the top face of the inner bearing 141, and collects to a certain degree in the annular groove 31b will be launched in the radially outward direction due to the centrifugal force associated with the rotation of the shaft 31, allowing the oil to be effectively returned to the inner bearing 141 and the outer bearing 142.

Furthermore, in the brushless motor of this example, an annular oil repellent member 146 is fitted in the opening in the bearing housing 143, and the bottom face of the oil repellent member 146 is positioned higher than the top edge of the annular groove 31b. Specifically, a space S is formed between the bottom face of the oil repellent member 146 and the top faces of the inner bearing 141 and the outer bearing 142, and the annular groove 31b in the shaft 31 faces this space S.

By providing such an oil repellent member 146, in particular when the motor is used in a horizontal state or a state approaching the same, even if a large amount of oil is launched in the radially outward direction by the centrifugal force associated with the rotation of the shaft 31, it is possible to very effectively prevent oil from flying out of the bearing unit, allowing for a further extension of motor life.

Second Exemplary Mode of Embodiment

A brushless motor according to a second exemplary mode of embodiment of the present invention differs from the first exemplary mode of embodiment only in the structure of the bearing unit.

Figure 4:
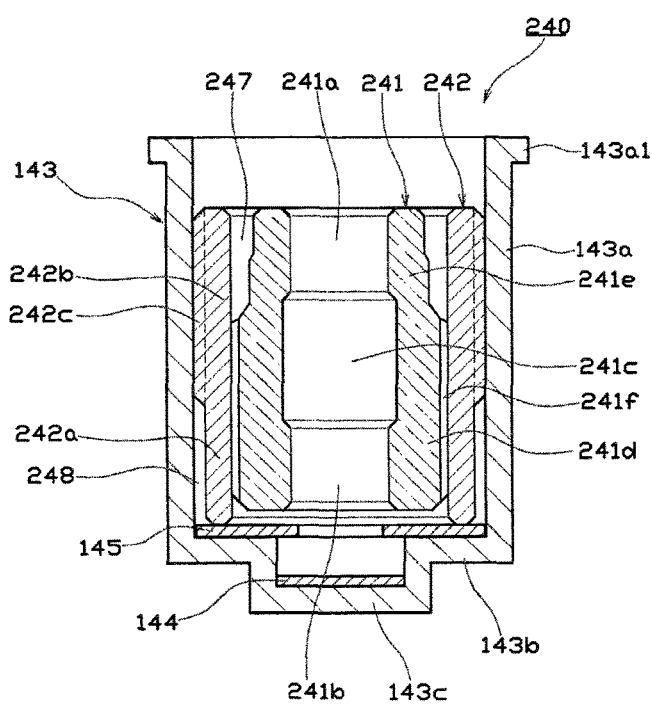
FIG. 4 is a sectional view of a bearing unit for a brushless motor according to a second exemplary mode of embodiment of the present invention (note that the oil repellent member is omitted).

A bearing unit 240 in this example is shown in FIG. 4. In FIG. 4, parts that are the same as parts in FIG. 1 to FIG. 3 are given identical reference numerals, and description of redundant parts is omitted.

In the same manner as the preceding inner bearing 141, the inner bearing 241 in this example has an upper bearing part 241a, a lower bearing part 241b, and a central relief part 241c.

The outer shape of the inner bearing 241 is such that there is a large diameter part 241d having a uniform outer diameter in a region extending from the lower bearing part 241b and over the majority of the central relief part 241c, and there is a reduced diameter part 241e, with an outer diameter that is smaller than the large diameter part 241d, in an area extending from the vicinity of the top end of the central relief part 241c to the upper bearing part 241a.

A plurality of grooves 241f are formed in the axial direction, in the outer circumferential face of the large diameter part 241d, equidistantly spaced apart in the circumferential direction.

The inner diameter of the outer bearing 242 in this example is uniform over the entire length thereof, in the axial direction. The outer shape of the outer bearing 242 is such that there is a large diameter part 242b, having a large outer diameter, in a region located radially outward from the inner bearing 241, and extending from the upper bearing part 241a to the vicinity of the bottom end of the central relief part 241c. Furthermore, there is a reduced diameter part 242a, having a smaller outer diameter than the large diameter part 242b, in a region below the large diameter part 242b.

A plurality of grooves 242c are formed in the axial direction, in the outer circumferential face of the large diameter part 242b of the outer bearing 242, equidistantly spaced apart in the circumferential direction.

In the brushless motor of the present example using the aforementioned bearing unit 240, while the inner diameter of the outer bearing 242 is uniform along the entire axial length thereof, a reduced diameter part 241e, having a smaller outer diameter, is provided in a predetermined region of the inner bearing 241. Consequently, an upper gap 247 is formed between the upper bearing part 241a and the outer bearing 242 located radially outward from the upper bearing part 241a, along the entire axial length of the upper bearing part 241a. This upper gap 247 is formed along the entire circumference.

Furthermore, in the brushless motor of this example, while the inner diameter of the cylindrical part 143a of the bearing housing 143 is uniform, a reduced diameter part 242a, having a smaller outer diameter, is provided in a predetermined region of the outer bearing 242. Consequently, a lower gap 248 is formed between the outer bearing 242 and the bearing housing 143 located radially outward from the lower bearing part 241b, along the entire axial length of the lower bearing part 241b. This lower gap 248 is formed along the entire circumference.

Thus, in the brushless motor in this example, gaps (the upper gap 247 and the lower gap 248) are provided between the bearing and the bearing housing 143, along the entire axial lengths of all of the bearing parts (the upper bearing part 241a and the lower bearing part 241b) of the inner bearing 241.

With such a configuration, when the double bearing comprising the inner bearing 241 and the outer bearing 242 is press fit in the bearing housing 143, large compressive forces are effectively prevented from acting in the radial direction on the upper bearing part 241a and the lower bearing part 241b of the inner bearing 241. Consequently, it is possible to prevent contractions in the inner diameters of the upper bearing part 241a and the lower bearing part 241b, such that the precision of the inner diameter of the bearing parts can be maintained, allowing for high precision rotational performance.

Furthermore, in the brushless motor of this example, a reduced diameter part 242a, which has a small outer diameter, is provided in the lower region of the outer bearing 242, whereby the double bearing can easily be press fit into the bearing housing, which improves work characteristics when assembling the motor.

Third Exemplary Mode of Embodiment

A brushless motor according to a third exemplary mode of embodiment of the present invention differs from the first exemplary mode of embodiment only in the structure of the bearing unit.

Figure 5:
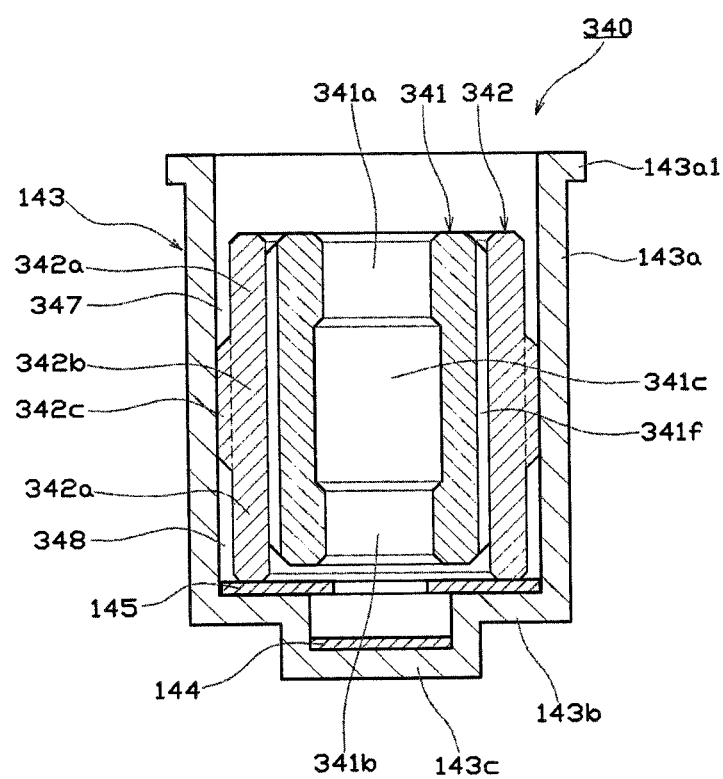
FIG. 5 is a sectional view of a bearing unit for a brushless motor according to a third exemplary mode of embodiment of the present invention (note that the oil repellent member is omitted).

A bearing unit 340 in this example is shown in FIG. 5. In FIG. 5, parts that are the same as parts in FIG. 1 to FIG. 3 are given identical reference numerals, and description of redundant parts is omitted.

In the same manner as the preceding inner bearing 141, the inner bearing 341 in this example has an upper bearing part 341a, a lower bearing part 341b, and a central relief part 341c. The outer diameter of this inner bearing 341 is uniform along the entire axial length thereof.

A plurality of grooves 341f are formed in the axial direction, in the outer circumferential face of the inner bearing 341, equidistantly spaced apart in the circumferential direction.

The inner diameter of the outer bearing 242 in this example is uniform over the entire length thereof, in the axial direction. The outer shape of the outer bearing 242 is such that there is a large diameter part 342b, having a large outer diameter, in a region located radially outward from the inner bearing 241, extending from the vicinity of the top end of the central relief part 241c to the vicinity of the bottom end thereof, and there are reduced diameter parts 342a, having a smaller outer diameters than the large diameter part 342b in the remaining regions.

A plurality of grooves 342c are formed in the axial direction, in the outer circumferential face of the large diameter part 342b of the outer bearing 342, equidistantly spaced apart in the circumferential direction.

In the brushless motor of this example using the bearing unit 340 described above, while the inner diameter of the cylindrical part 143a of the bearing housing 143 is uniform, reduced diameter parts 342a, having smaller outer diameters, are provided in predetermined regions of the outer bearing 342. Consequently, gaps (the upper gap 347 and the lower gap 348) are provided between the bearing and the bearing housing 143, along the entire axial lengths of all of the bearing parts (the upper bearing part 341a and the lower bearing part 341b) of the inner bearing 341. These gaps (the upper gap 347 and the lower gap 348) are formed along the entire circumference.

With such a configuration, when the double bearing comprising the inner bearing 341 and the outer bearing 342 is press fit in the bearing housing 143, large compressive forces are effectively prevented from acting in the radial direction on the upper bearing part 341a and the lower bearing part 341b of the inner bearing 341. Consequently, it is possible to prevent contractions in the inner diameters of the upper bearing part 341a and the lower bearing part 341b, such that the precision of the inner diameter of the bearing parts can be maintained, allowing for high precision rotational performance.

Furthermore, in the brushless motor of this example, a reduced diameter part 342a, which has a small outer diameter, is provided in the lower region of the outer bearing 342, whereby the double bearing can easily be press fit into the bearing housing, which improves work characteristics when assembling the motor.

Fourth Exemplary Mode of Embodiment

A brushless motor according to a fourth exemplary mode of embodiment of the present invention differs from the first exemplary mode of embodiment only in the structure of the bearing unit.

Figure 6:
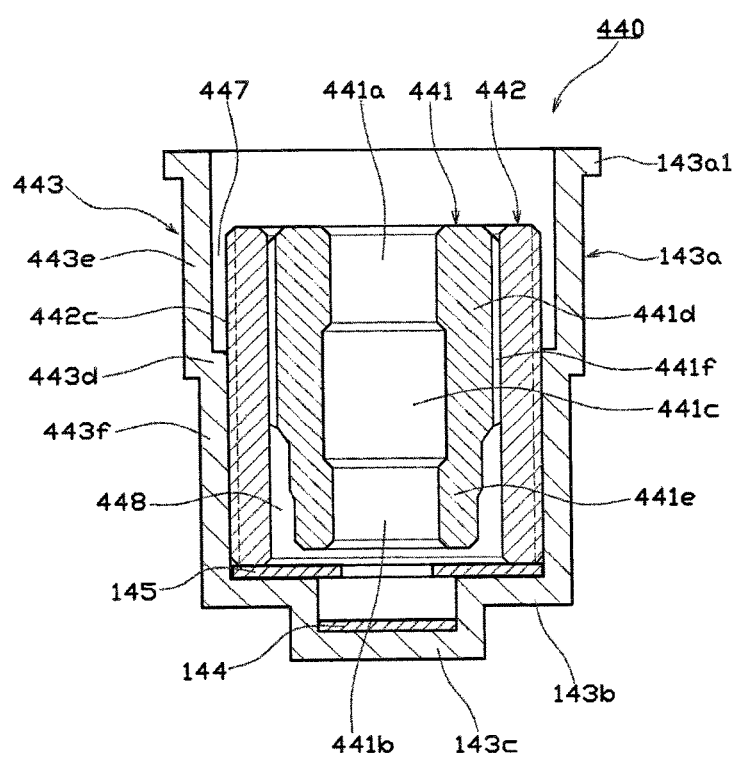
FIG. 6 is a sectional view of a bearing unit for a brushless motor according to a fourth exemplary mode of embodiment of the present invention (note that the oil repellent member is omitted).

A bearing unit 440 in this example is shown in FIG. 6. In FIG. 6, parts that are the same as parts in FIG. 1 to FIG. 3 are given identical reference numerals, and description of redundant parts is omitted.

In the same manner as the preceding inner bearing 141, the inner bearing 441 in this example has an upper bearing part 441a, a lower bearing part 441b, and a central relief part 441c.

The outer shape of the inner bearing 441 is such that there is a large diameter part 441d having a uniform outer diameter in a region extending from the upper bearing part 441a and over the majority of the central relief part 441c, and there is a reduced diameter part 441e, with an outer diameter that is smaller than the large diameter part 441d, in a region extending from the vicinity of the bottom end of the central relief part 441c to the lower bearing part 441b.

A plurality of grooves 441f are formed in the axial direction, in the outer circumferential face of the large diameter part 441d, equidistantly spaced apart in the circumferential direction.

The inner diameter and the outer diameter of the outer bearing 442 in this example are uniform over the entire length thereof, in the axial direction. A plurality of grooves 442c are formed in the axial direction, in the outer circumferential face of the outer bearing 442, equidistantly spaced apart in the circumferential direction.

In the bearing housing 443 of this example, a step 443d is provided in the middle of the cylindrical part 143a, such that there is a large diameter part 443e, having a large inner diameter, above the step 443d, and a small diameter part 443f, having a small inner diameter, below the step 443d.

In the brushless motor of the present example using the aforementioned bearing unit 440, while the outer diameter of the outer bearing 442 is uniform along the entire axial length thereof, a large diameter part 443e, having a large outer diameter, is provided in a predetermined region of the bearing housing 443. Consequently, an upper gap 447 is formed between the upper bearing part 441a and the bearing housing 443 located radially outward from the upper bearing part 441a, along the entire axial length of the upper bearing part 441a. This upper gap 447 is formed along the entire circumference.

Further, in the brushless motor of the present example, while the inner diameter of the outer bearing 442 is uniform along the entire axial length thereof, a reduced diameter part 441e, having a smaller outer diameter, is provided in a predetermined region of the inner bearing 441. Consequently, a lower gap 448 is formed between the lower bearing part 441b and the outer bearing 442 located radially outward from the lower bearing part 441b, along the entire axial length of the lower bearing part 441b. This lower gap 448 is formed along the entire circumference.

Thus, in the brushless motor in this example, gaps (the upper gap 447 and the lower gap 448) are provided between the bearing and the bearing housing 443, along the entire axial length of all of the bearing parts (the upper bearing part 441a and the lower bearing part 441b) of the inner bearing 441.

With such a configuration, when the double bearing comprising the inner bearing 441 and the outer bearing 442 is press fit in the bearing housing 443, large compressive forces are effectively prevented from acting in the radial direction on the upper bearing part 441a and the lower bearing part 441b of the inner bearing 441. Consequently, it is possible to prevent contractions in the inner diameters of the upper bearing part 441a and the lower bearing part 441b, such that the precision of the inner diameter of the bearing parts can be maintained, allowing for high precision rotational performance.

Fifth Exemplary Mode of Embodiment

A brushless motor according to a fifth exemplary mode of embodiment of the present invention differs from the first exemplary mode of embodiment only in the structure of the bearing unit.

Figure 7:
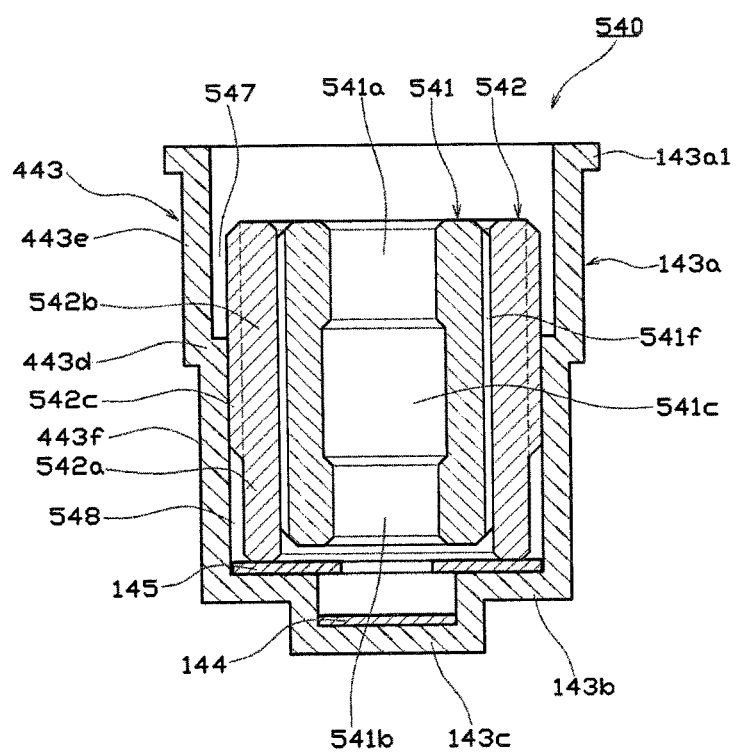
FIG. 7 is a sectional view of a bearing unit for a brushless motor according to a fifth exemplary mode of embodiment of the present invention (note that the oil repellent member is omitted).

A bearing unit 540 in this example is shown in FIG. 7. In FIG. 7, parts that are the same as parts in FIG. 1 to FIG. 3 are given identical reference numerals, and description of redundant parts is omitted.

In the same manner as the preceding inner bearing 141, the inner bearing 541 in this example has an upper bearing part 541a, a lower bearing part 541b, and a central relief part 541c. The outer diameter of this inner bearing 541 is uniform along the entire axial length thereof.

Furthermore, a plurality of grooves 541f are formed in the axial direction, in the outer circumferential face of the inner bearing 541, equidistantly spaced apart in the circumferential direction.

The inner diameter of the outer bearing 542 in this example is uniform along the entire axial length. The outer shape of the outer bearing 542 is such that there is a large diameter part 542b, having a large outer diameter, in a region located radially outward from the inner bearing 541, and extending from the upper bearing part 541a to the vicinity of the bottom end of the central relief part 541c, and there is a reduced diameter part 542a, having an outer diameter that is smaller than the large diameter part 542b, in a region below the large diameter part 542b.

A plurality of grooves 542c are formed in the axial direction, in the outer circumferential face of the large diameter part 542b of the outer bearing 542, equidistantly spaced apart in the circumferential direction.

In the bearing housing 443 of this example, a step 443d is provided in the middle of the cylindrical part 143a, such that there is a large diameter part 443e, having a large inner diameter, above the step 443d, and a small diameter part 443f, having a small inner diameter, below the step 443d.

In the brushless motor of this example using the bearing unit 540 described above, a large diameter part 443e having a large outer diameter, is provided in a predetermined region of the bearing housing 443, and therefore an upper gap 547 is formed between the bearing housing 443 and the outer bearing 542 located radially outward from the upper bearing part 541a, along the entire axial length of the upper bearing part 541a. This upper gap 547 is formed along the entire circumference.

Further, in the brushless motor of the present example, while the outer diameter of the inner bearing 541 and the inner diameter of the outer bearing 542 are uniform along the entire axial lengths thereof, a reduced diameter part 542a, having a smaller outer diameter, is provided in a predetermined region of the outer bearing 542. Consequently, a lower gap 548 is formed between the bearing housing 443 and the outer bearing 542 located radially outward from the lower bearing part 541b, along the entire axial length of the lower bearing part 541b. This lower gap 548 is formed along the entire circumference.

Thus, in the brushless motor in this example, gaps (the upper gap 547 and the lower gap 548) are provided between the bearing and the bearing housing 443, along the entire axial length of all of the bearing parts (the upper bearing part 541a and the lower bearing part 541b) of the inner bearing 541.

With such a configuration, when the double bearing comprising the inner bearing 541 and the outer bearing 542 is press fit in the bearing housing 443, large compressive forces are effectively prevented from acting in the radial direction on the upper bearing part 541a and the lower bearing part 541b of the inner bearing 541. Consequently, it is possible to prevent contractions in the inner diameters of the upper bearing part 541a and the lower bearing part 541b, such that the precision of the inner diameter of the bearing parts can be maintained, allowing for high precision rotational performance.

Furthermore, in the brushless motor of this example, a reduced diameter part 542*a*, which has a small outer diameter, is provided in the lower region of outer bearing 542, whereby the double bearing can easily be press fit into the bearing housing, which improves work characteristics when assembling the motor.

Five exemplary modes of embodiment of the present invention were described above, but the present invention is not limited to these exemplary modes of embodiment, and the exemplary modes of embodiment described above can be suitably modified within a range that does not depart from the gist of the present invention.

Specifically, for the structure that provides gaps between the bearing parts and the bearing housing, along the entire axial lengths of the bearing parts, in addition to the exemplary modes of embodiment, it is also possible, for example, to adopt a structure in which an upper gap is provided between the upper bearing part and the outer bearing, along the entire axial length of the upper bearing part, and a lower gap is provided between the lower bearing part and the outer bearing, along the entire axial length of the lower bearing part.

Furthermore, in the exemplary modes of embodiment, a rotor retaining structure was adopted in which the retaining plate was engaged in the engaged part of the shaft, but it is possible to adopt any conventionally known retaining structure.

What is claimed is:

1. A brushless motor comprising:
a rotor having a shaft;
a cylindrical bearing that supports the shaft in a radial direction with oil as an intermediary medium; and
a bearing housing that is open at a top end, at an interior of which the bearing is fastened,
wherein: the cylindrical bearing has an inner bearing made from a porous oil-impregnated material and an outer bearing made form a porous oil-impregnated material, mounted on an outer circumferential face of the inner bearing; the inner bearing has a bearing portion formed protruding in a radially inward direction, so as to rotatably support the radial direction of the shaft;
the oil content of the outer bearing is greater than that of the inner bearing and so that the outer bearing supplies oil to the inner bearing; and
a gap is provided between the bearing portion and the bearing housing located radially outward from the bearing portion, along an entire axial length of the bearing portion.

2. The brushless motor according to claim 1, wherein the bearing portion comprises an upper bearing portion provided at a top of the inner bearing, and a lower bearing provided at a bottom of the inner bearing.

3. The brushless motor according to claim 2, wherein the gap is provided between the outer bearing and the bearing housing located radially outward from the upper bearing portion, along the entire axial length of the upper bearing portion, and the gap is provided between the lower bearing portion and the outer bearing located radially outward from the lower bearing portion, along the entire axial length of the lower bearing portion.

4. The brushless motor according to claim 2, wherein the gap is provided between the upper bearing portion and the outer bearing located radially outward from the upper bearing portion, along the entire axial length of the upper bearing portion, and the gap is provided between the outer bearing and the bearing housing located radially outward from the lower bearing portion, along the entire axial length of the lower bearing portion.

5. The brushless motor according to claim 2, wherein the gap is provided between the outer bearing and the bearing housing located radially outward from the upper bearing portion, along the entire axial length of the upper bearing portion, and the gap is provided between the outer bearing and the bearing housing located radially outward from the lower bearing portion, along the entire axial length of the lower bearing portion.

6. The brushless motor according to claim 2, wherein the gap is provided between the upper bearing portion and the outer bearing located radially outward from the upper bearing portion, along the entire axial length of the upper bearing portion, and the gap is provided between the lower bearing portion and the bearing housing located radially outward from the lower bearing portion, along the entire axial length of the lower bearing portion.

7. The brushless motor according to claim 1, wherein a groove communicating in the axial direction is provided between the outer circumferential face of the inner bearing and an inner circumferential face of the outer bearing.

8. The brushless motor according to claim 1, wherein a groove communicating in the axial direction is provided between an outer circumferential face of the outer bearing and an inner circumferential face of the bearing housing.

9. The brushless motor according to claim 1, wherein a groove communicating in the axial direction is provided between the outer circumferential face of the inner bearing and an inner circumferential face of the outer bearing, and a groove communicating in the axial direction is provided between an outer circumferential face of the outer bearing and an inner circumferential face of the bearing housing.

10. The brushless motor according to claim 2, wherein a groove communicating in the axial direction is provided between the outer circumferential face of the inner bearing and an inner circumferential face of the outer bearing.

11. The brushless motor according to claim 2, wherein a groove communicating in the axial direction is provided between an outer circumferential face of the outer bearing and an inner circumferential face of the bearing housing.

12. The brushless motor according to claim 2, wherein a groove communicating in the axial direction is provided between the outer circumferential face of the inner bearing and an inner circumferential face of the outer bearing, and a groove communicating in the axial direction is provided between an outer circumferential face of the outer bearing and an inner circumferential face of the bearing housing.

13. The brushless motor according to claim 1, wherein an annular groove is formed in an outer surface of the shaft in a portion of the shaft that protrudes from the inner bearing toward the open top end of the bearing housing.

14. The brushless motor according to claim 13, wherein an annular oil repellant member is mounted at the open top end of the bearing housing and a bottom face of the oil repellant member is at a higher axial position than a top edge of the annular groove.

15. The brushless motor according to claim 2, wherein an annular groove is formed in an outer surface of the shaft in a portion of the shaft that protrudes from the inner bearing toward the open top end of the bearing housing.

16. The brushless motor according to claim 15, wherein an annular oil repellant member is mounted at the open top end of the bearing housing and a bottom face of the oil repellant member is at a higher axial position than a top edge of the annular groove.

17. The brushless motor according to claim 1, wherein an entire axial length of the inner bearing extends within the bearing housing and an entire axial length of the outer bearing extends within the bearing housing, so that all of the cylindrical bearing is located within said interior of the bearing housing.

18. The brushless motor according to claim 1, wherein the bearing housing has a bottom end and said top end, and wherein an entire axial length of the inner bearing extends axially within the bearing housing between said bottom end and said top end, and an entire axial length of the outer bearing extends within the bearing housing between said bottom end and said top end.

* * * * *